United States Patent
Perriere

(10) Patent No.: US 10,066,605 B2
(45) Date of Patent: Sep. 4, 2018

(54) ELECTRIC CURRENT GENERATING TURBINE

(75) Inventor: Bernard Perriere, Echirolles (FR)

(73) Assignee: Save Innovations, Grenoble (FR)

( * ) Notice: Subject to any disclaimer, the term of this patent is extended or adjusted under 35 U.S.C. 154(b) by 0 days.

(21) Appl. No.: 14/118,340

(22) PCT Filed: May 3, 2012

(86) PCT No.: PCT/FR2012/000173
§ 371 (c)(1),
(2), (4) Date: Nov. 18, 2013

(87) PCT Pub. No.: WO2012/156593
PCT Pub. Date: Nov. 22, 2012

(65) Prior Publication Data
US 2014/0183872 A1      Jul. 3, 2014

(30) Foreign Application Priority Data

May 16, 2011   (FR) ...................... 11 01475

(51) Int. Cl.
| | | |
|---|---|---|
| *F03D 9/00* | (2016.01) | |
| *H02K 7/18* | (2006.01) | |
| *H02K 21/12* | (2006.01) | |
| *F03D 1/04* | (2006.01) | |
| *F03D 9/25* | (2016.01) | |

(52) U.S. Cl.
CPC ............ *F03D 9/002* (2013.01); *F03D 1/04* (2013.01); *F03D 9/25* (2016.05); *H02K 7/1823* (2013.01); *H02K 7/1838* (2013.01); *H02K 21/12* (2013.01); *Y02E 10/725* (2013.01)

(58) Field of Classification Search
CPC .......... H02K 3/00; H02K 3/04; H02K 7/1823; H02K 21/12; F03D 1/04
USPC ...... 290/44, 55; 310/179, 210, 198, 184, 195
See application file for complete search history.

(56) References Cited

U.S. PATENT DOCUMENTS

| | | | |
|---|---|---|---|
| 3,353,028 A * | 11/1967 | Braikevitch et al. | 290/52 |
| 4,319,152 A * | 3/1982 | van Gils | 310/201 |
| 4,367,413 A * | 1/1983 | Nair | 290/52 |
| 4,367,890 A * | 1/1983 | Spirk | 290/52 |
| 4,464,580 A * | 8/1984 | Miller et al. | 290/52 |
| 4,496,927 A * | 1/1985 | Inoue | 336/208 |

(Continued)

FOREIGN PATENT DOCUMENTS

| | | |
|---|---|---|
| CA | 2 345 508 A | 10/2002 |
| DE | 202 03 119 U | 5/2002 |

(Continued)

OTHER PUBLICATIONS

JP 2005-237128A English machine translation, 2005.*

(Continued)

*Primary Examiner* — Julio C. Gonzalez
(74) *Attorney, Agent, or Firm* — Haug Partners LLP

(57) ABSTRACT

The invention relates to a turbine which can generate an electric current, comprising a motor and a stator. The rotor is formed by a blade having a permanent magnet mounted thereon. The stator includes first and second coils which are positioned close to one another and have substantially orthogonal winding axes, said coils co-operating with the permanent magnet in order to generate the electric current.

18 Claims, 3 Drawing Sheets

(56) References Cited

U.S. PATENT DOCUMENTS

| | | | | |
|---|---|---|---|---|
| 4,600,405 | A * | 7/1986 | Zibelin | A61M 1/101 623/3.1 |
| 4,720,640 | A * | 1/1988 | Anderson et al. | 290/43 |
| 5,334,898 | A * | 8/1994 | Skybyk | 310/268 |
| 5,729,071 | A * | 3/1998 | Steiner | H02K 1/14 310/172 |
| 5,744,896 | A * | 4/1998 | Kessinger, Jr. | H02K 3/04 310/198 |
| 5,798,591 | A * | 8/1998 | Lillington | H02K 3/04 310/164 |
| 6,396,186 | B1 * | 5/2002 | Post | H02K 7/025 310/156.43 |
| 6,791,670 | B2 * | 9/2004 | Miyajima et al. | 355/72 |
| 6,930,433 | B2 * | 8/2005 | Bales | H02K 1/2793 310/156.35 |
| 7,598,646 | B2 | 10/2009 | Cleveland | |
| 7,795,773 | B1 * | 9/2010 | Wittig | 310/179 |
| 9,143,024 | B2 * | 9/2015 | Kusase | H02K 3/28 |
| 2006/0082239 | A1 * | 4/2006 | Rajasingham | 310/208 |
| 2008/0272666 | A1 * | 11/2008 | Halstead | H02K 3/04 310/156.36 |
| 2010/0084938 | A1 * | 4/2010 | Palmer et al. | 310/156.36 |
| 2010/0314885 | A1 * | 12/2010 | Presz, Jr. | F03D 1/04 290/55 |
| 2010/0321664 | A1 * | 12/2010 | Makarovic et al. | 355/72 |
| 2011/0320074 | A1 * | 12/2011 | Erlston | B60K 6/26 701/22 |
| 2012/0098371 | A1 * | 4/2012 | Pinneo et al. | 310/90.5 |
| 2013/0099618 | A1 * | 4/2013 | Kusase | H02K 3/28 310/156.56 |
| 2013/0140934 | A1 * | 6/2013 | Tanaka et al. | 310/198 |
| 2013/0229078 | A1 * | 9/2013 | Garber | 310/90.5 |

FOREIGN PATENT DOCUMENTS

| | | | |
|---|---|---|---|
| JP | 2004-166467 | A * | 6/2004 |
| JP | 2005-237128 | A * | 9/2005 |
| WO | WO 2011/002979 | A | 1/2011 |

OTHER PUBLICATIONS

Notice of Reasons for Rejection issued by Japanese Patent Office for corresponding Japanese application 2014-510846 dated Feb. 16, 2016 with English translation.

* cited by examiner

ELECTRIC CURRENT GENERATING TURBINE

This application is a 371 of PCT/FR2012/000173 filed on May 3, 2012, published on Nov. 22, 2012 under publication number WO 2012/156593, which claims priority benefits from French Patent Application Number 1101475 filed May 16, 2011, the disclosure of which is incorporated herein by reference.

FIELD OF THE INVENTION

The present invention relates to an electric current generating turbine and more particularly to a high efficiency turbine that can be driven by a low-speed fluid.

DESCRIPTION OF THE PRIOR ART

FIG. 1 schematically depicts an electric current generating turbine 1 according to the prior art. This turbine is of the wind generator type. It comprises an impeller 2 made up of blades 3 mounted to rotate on a shaft 4. The shaft is connected to a current generator, usually an alternator 5, able to supply an electric network 6 with a current I. When the wind blows at a speed Vf, the kinetic energy of this fluid is transmitted, via the impeller 2, to the shaft 4 in the form of mechanical power, turning the alternator 5. The alternator 5 therefore supplies an electric current I to the network 6.

There are various types of electric current generating turbines which differ from one another in terms of the type of fluid that drives the blades, in terms of the shape of the blades, and in terms of how the blades are mounted to rotate about an axis connected to a current generator. The efficiency of the current generator turbines of the prior art is limited, particularly when the fluid speed is low. The turbines of the prior art are heavy, complex and expensive. It is difficult to reduce the size of them to make them usable in roaming equipment that can easily be transported and moved around.

SUMMARY

One object of one embodiment of the present invention is to propose a current generating turbine of high efficiency.

Another object of another embodiment of the present invention is to propose a lightweight turbine.

Thus, one embodiment of the present invention provides a turbine able to generate an electric current which comprises a rotor comprising a blade which is mounted so as to rotate about a main axis, and a permanent magnet mounted on the blade at a position which is the most distant from the main axis, the turbine further comprising a stator provided with first and second coils the axes of winding of which are substantially orthogonal, the permanent magnet collaborating with said first and second coils as the rotor rotates in order to generate electric current, said first coil being close to said second coil.

According to another embodiment of the present invention, the first and second coils have cores made of non-magnetic material.

According to another embodiment of the present invention, the first and second coils respectively form two winding portions of one and the same diskoid coil, the axes of winding of which are substantially orthogonal.

According to another embodiment of the present invention, the permanent magnet is a permanent dipole magnet oriented parallel to the main axis of rotation of the blade.

According to another embodiment of the present invention, the permanent magnet comprises elementary magnets configured as a Halbach array.

According to another embodiment of the present invention, the permanent magnet is mounted on the blade via a spacer piece.

According to another embodiment of the present invention, the blade constitutes part of an impeller mounted to rotate about the main axis.

BRIEF DESCRIPTION OF THE DRAWINGS

These objects, features and advantages, together with others will be set out in detail in the following description of some particular forms of embodiment which is given by way of nonlimiting example in conjunction with the attached figures among which.

DETAILED DESCRIPTION

For the sake of clarity, only those elements that are of benefit in understanding the invention have been depicted and will be described. For the sake of clarity, like elements have been denoted by like references in the various figures and, furthermore, the various figures are not drawn to scale. To make the description easier to understand, the fluid speed Vf is assumed to be directed toward the front of the turbine. In the present description, a first direction is said to be substantially orthogonal to a second direction when the first direction makes an angle of 90 degrees, in absolute terms, to within 30 degrees, preferably to within 15 degrees, with the second direction.

Figure 2:
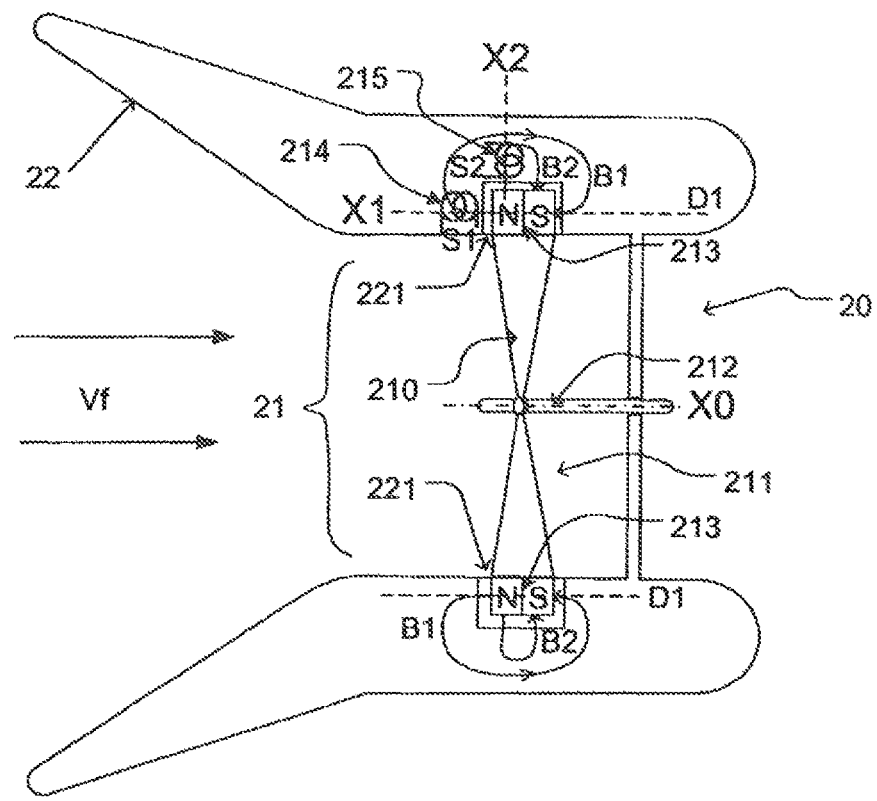
FIG. 2 is a view in longitudinal section of an electric current generating turbine according to one embodiment of the present invention.

FIG. 2 is a view in longitudinal section of an electric current generating turbine 20 according to one embodiment of the present invention. The turbine 20 comprises a rotor 21 and a stator 22, The rotor 21 comprises a blade 210 which, for example, forms part of an impeller 211 which is mounted to rotate about a main axis X0 of rotation, preferably on a shaft 212. The plane of section of FIG. 2 contains this main axis X0 of rotation. The blade 210 is subjected to the action of an incident fluid the speed Vf of which is, for example, colinear with the main axis X0 of rotation. The rotor 21 comprises, at one end of the blade 210 being the most distant from the main axis X0 of rotation, a permanent magnet 213, for example of the dipole type, mounted on the blade 210. In the particular instance of the example of FIG. 2, the permanent dipole magnet 213, depicted in the plane of section of FIG. 2, forms a magnetic dipole, the axis D1 of which is parallel to the main axis X0 of rotation, the North pole N of the permanent dipole magnet 213 being directed toward the front of the turbine, i.e. facing into the fluid. A magnetic field, or magnetic induction, is created all around the magnet. The magnetic induction comprises a multitude of magnetic field lines running from the North pole N to the South pole S around the outside of the permanent dipole magnet 213 at varying angles. Thus, for example, a first set of magnetic field lines B1 leaves the permanent dipole magnet 213 via the North pole N and crosses through a first region 214 near the North pole N of the permanent dipole magnet 213. In this first region 214, which is situated at the end of the permanent dipole magnet 213 and on the axis D1 of the magnetic dipole, the magnetic field lines are parallel to the axis D1 of the magnetic dipole and to the main axis X0 of rotation. Thereafter, the field lines of the first set of magnetic field lines B1 curl over to head for the South pole S of the permanent dipole magnet 213. For example, a second set of magnetic field lines B2 leaves the permanent dipole magnet 213 via the North pole N and passes across a second region 215, near the North pole N of the permanent dipole magnet 213. In this second region 215 situated laterally to the permanent dipole magnet 213 the magnetic field lines are orthogonal to the axis D1 of the magnetic dipole and to the main axis X0 of rotation. Thereafter, the field lines of the second set of magnetic field lines B2 curl over to head toward the South pole S of the permanent dipole magnet 213. The first and second regions 214 and 215 crossed by the magnetic induction of the permanent dipole magnet 213 are defined in a rotary geometric frame of reference attached to the permanent dipole magnet 213. The magnetic field lines in the first region 214 are substantially orthogonal to the magnetic field lines in the second region 215.

The stator 22 which, for example, surrounds the rotor 21, comprises for example an annular groove 221 formed in the plane in which the rotation of the permanent dipole magnet 213 of the blade 210 can be inscribed. The groove 221 is shaped to accommodate the permanent dipole magnet 213 as it rotates about the main axis X0 of rotation.

The stator 22 comprises a first coil S1 and a second coil S2, for example solenoids. The first and second coils S1 and S2 are positioned in the stator 22 in such a way that they find themselves simultaneously and respectively in the first and second regions 214 and 215 when the permanent magnet 213 is, as a result of its rotation about the main axis X0 of rotation, closest to the first coil S1 and to the second coil S2, respectively. The first and second coils are close to one another. In other words, the first and second coils S1 and S2 are close if, for a position of the magnet 213, they are simultaneously subjected to the magnetic field, of the magnet 213 so as to be able to generate a current or a voltage, it being possible for this definition to apply to all embodiments of the present invention. For example, the first coil is close to the second coil when the distance separating the first and second coils is of the order of magnitude of the dimension of the permanent magnet, for example less than five times the distance between the North pole N and the South pole S of the permanent dipole magnet 213. The first and second axes of winding X1 and X2 of the coils S1 and S2 are substantially orthogonal so that they are tangential to the field lines of the magnetic induction of the permanent dipole magnet 213 when the permanent dipole magnet 213 is, through the effect of its rotating about the main axis X0 of rotation, closest to the first coil S1 and to the second coil S2. The variations in the flux of the magnetic induction, generated by the permanent dipole magnet 213 rotating about the main axis X0 of rotation, in the first S1 and second S2 coils are maximized because the magnetic fluxes are oriented respectively along the axes of winding X1 and X2 of the first and second coils S1 and S2. That results in induced voltages at the terminals of the first and second coils S1 and S2 which are maximized and able to generate a maximum current in an impedance connected at the terminals of the coils. The permanent dipole magnet 213 collaborates with the first and second coils S1 and S2, close to one another, the axes of winding X1 and X2 of which are substantially orthogonal in order to generate a maximum electric current. The maximum efficiency for the turbine 20 as the rotor 21 rotates is thus achieved.

The number of stator coils is unlimited. Other coils may be positioned so as to collaborate with various sets of magnetic field lines in different regions situated around the permanent dipole magnet 213 in order to collaborate with the maximum number of magnetic field lines.

In particular, thanks to the layout of the coils S1 and S2, there is no need to install heavy and expensive metal pole pieces in the stator 22 in order to orient, channel or increase the magnetic induction in the coils because the various coils are positioned and oriented in the regions where the magnetic induction reaches a maximum as the permanent dipole magnet 213 passes. According to one particular embodiment of the present invention, the core of the various coils is made of a non-magnetic material. This non-magnetic material may, for example, consist of a molding resin forming the stator 22.

The coils collaborating with a magnetic field may be solenoids, as has been assumed for the case of the embodiment described in conjunction with FIG. 2. They may also be of diskoid shape. A diskoid coil is formed of turns wound in the same plane at a variable radius of winding. The axis of diskoid winding is the axis perpendicular to the plane of the turns of the coil passing through the center of the surface defined by the turns. The diskoid coil may generally be substituted for a solenoid, notably in the embodiments of the present invention that are described hereinabove in conjunction with FIG. 2.

Figure 3:
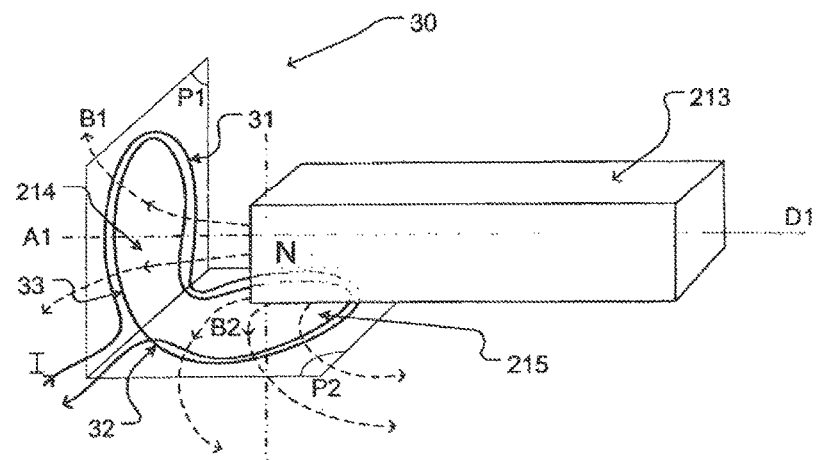
FIG. 3 is a perspective view of a two-axis diskoid coil suited to another embodiment of the present invention.

FIG. 3 is a perspective view according to another embodiment of the present invention, of a diskoid coil 30 equipped with two diskoid portions the axes of winding of which are substantially orthogonal. In other words, this embodiment differs from the embodiment described in conjunction with FIG. 2 in that the first and second coils S1 and S2 respectively form two winding portions of one and the same diskoid coil 30, the axes of winding A1 and A2 of said portions being substantially orthogonal.

A wire, for example made of copper, forms a first substantially circular turn 31 in a first plane P1 about a first axis of diskoid winding A1 then the wire continues into a substantially circular second turn 32, in a second plane 22 orthogonal to the first plane P1 about a second axis of diskoid winding A2, Thereafter, the wire of the second turn continues once again in the first plane P1 to form a substantially circular third turn 33 about the first axis of diskoid winding A1 and so on until a diskoid coil 30 comprising numerous turns and having a first portion with a first diskoid axis A1 and a second portion with a second diskoid axis A2 substantially orthogonal to the first diskoid axis A1 is formed.

The diskoid coil 30 with two substantially orthogonal axes of diskoid winding is positioned in the stator in such a way that the orthogonal axes of diskoid winding A1 and A2 are tangential to the field lines of the magnetic induction of the permanent dipole magnet 213, for example in the first 214 and second 215 regions respectively when the permanent dipole magnet 213 is closest to the diskoid coil 30 through the effect of the rotation of the permanent dipole magnet 213 about the main axis X0 of rotation.

Figure 1:
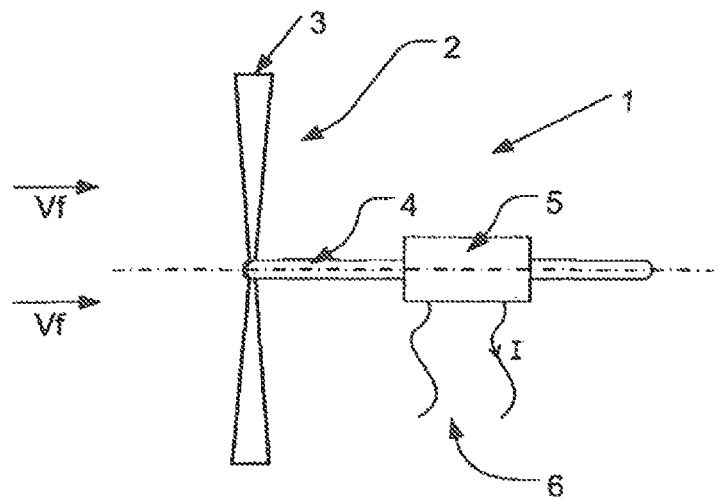
FIG. 1, already described, is a schematic view of an electric current generating turbine according to the prior art.
Figure 4:
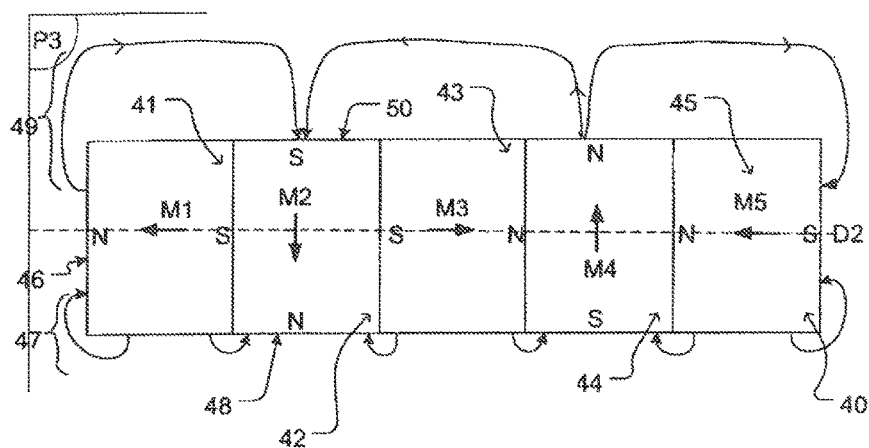
FIG. 4 is a longitudinal view of a Halbach linear permanent magnet.

FIG. 4 is a longitudinal view of a Halbach linear permanent magnet. Permanent magnets made up of elementary dipole magnets assembled in such a way that the magnetic induction is concentrated and focused in favored directions are known from the prior art. These dipole magnets then form a Halbach array. For example, U.S. Pat. No. 7,598,646 B2 in FIG. 1 under the reference 120 describes a Halbach linear permanent magnet which is reproduced in the present FIG. 4 under reference 40. The Halbach linear permanent magnet 40 is formed by an assembly, in this order, along an axis D2 in a plane of assembly P3 of five successive elementary permanent dipole magnets a first elementary magnet 41, a second elementary magnet 42, a third elementary magnet 43, a fourth elementary magnet 44 and a fifth elementary magnet 45. Each of these five elementary dipole magnets has an internal magnetic moment these respectively being a first magnetic moment M1, a second magnetic moment M2, a third magnetic moment M3, a fourth magnetic moment M4, a fifth magnetic moment M5, oriented from the South pole toward the North pole of the elementary permanent dipole magnet concerned. The internal magnetic moment is symbolized in FIG. 4 by an arrow pointing from the South pole S to the North pole N of each dipole magnet. In the example of the Halbach linear permanent magnet 40 of FIG. 4, the first magnetic moment M1 of the first elementary magnet 41 is directed along the axis D2 of the Halbach linear permanent magnet 40 toward the free end 46 of the first elementary magnet 41. Next, in the plane of assembly P3 of the five elementary magnets 41, 42, 43, 44, 45 the magnetic moment of each subsequent elementary magnet 42, 43, 44, 45 makes with the magnetic moment of the elementary magnet 41, 42, 43, 44 preceding it an angle which is oriented at +90 degrees. The Halbach linear permanent magnet 40 constructed in this way develops, in the plane of assembly P3, a magnetic induction 47 that is weak on a first side 48 of the Halbach linear permanent magnet 40 which is situated on the North pole side of the second elementary magnet 42. The first side 48 of the Halbach linear permanent magnet 40 is parallel to the axis D2 of the Halbach linear permanent magnet 40. Strong magnetic induction 49 is developed on a second side 50 of the Halbach linear permanent magnet 40 which is the opposite side to the first side 48 and is situated in the plane of assembly P3 of the Halbach linear permanent magnet 40.

On the second side 50 of the Halbach linear permanent magnet 40 and as a result of the layout of the magnetic moments M1, M2, M3, M4 and M5 of the five elementary magnets, the magnetic induction on the second side 50 is perpendicular to the axis D2 of the Halbach linear permanent magnet 40 near the central parts of the second 42 and fourth 44 elementary magnets. The magnetic induction on the second side 50 is parallel to the axis D2 of the Halbach linear permanent magnet 40 near the central part of the third elementary magnet 43.

Figure 5:
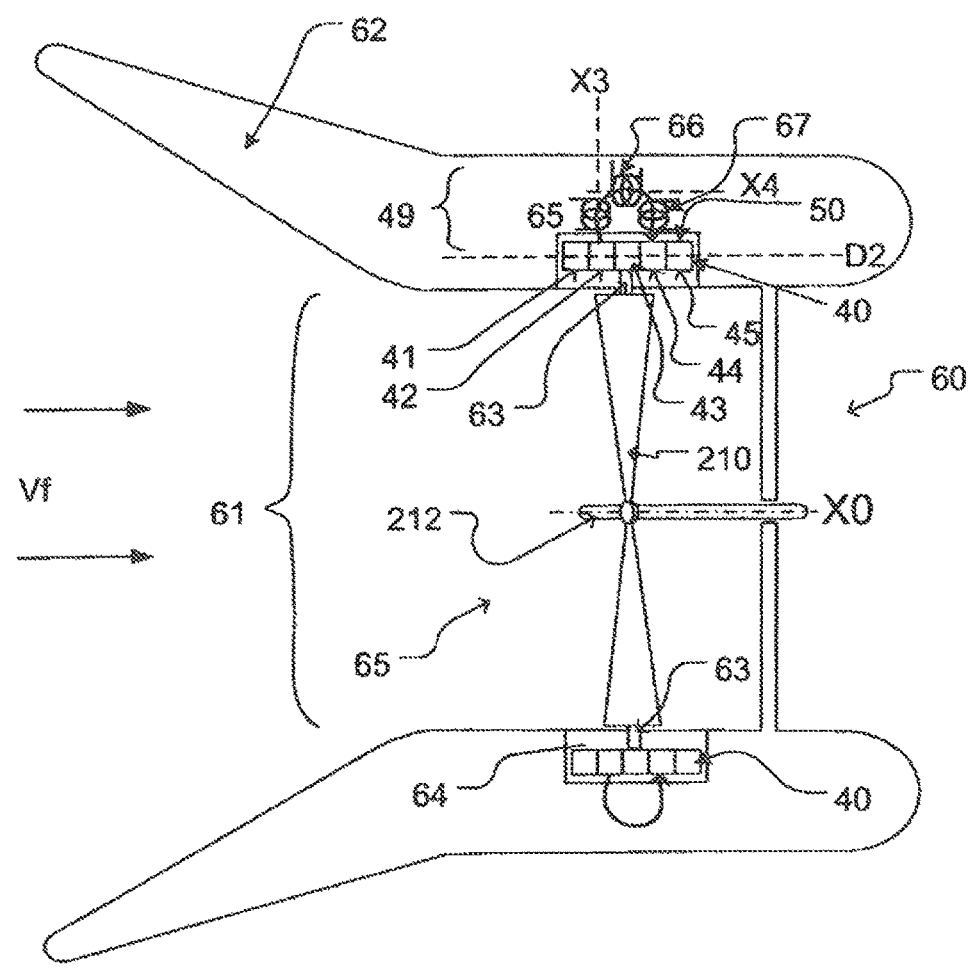
FIG. 5 is a view in longitudinal section of an electric current generating turbine using a Halbach linear permanent magnet according to another embodiment of the present invention.

FIG. 5 is a view in longitudinal section of an electric current generating turbine 60 using the Halbach linear permanent magnet 40 described in conjunction with FIG. 4, according to another embodiment of the present invention. The turbine 60 comprises a rotor 61 and a stator 62 which are similar to the rotor and to the stator described in conjunction with FIG. 2. The rotor 61 comprises the blade 210 mounted to rotate about the main axis X0 of rotation, preferably on the shaft 212. The blade 210 comprises, at an end being the most distant from the main axis X0 of rotation, the Halbach linear permanent magnet 40 described in conjunction with FIG. 4. The Halbach linear permanent magnet 40 is mounted on the blade 210, for example via a spacer piece 63. For example, the Halbach linear permanent magnet 40 is positioned on the blade 210 in such a way that its plane of assembly P3 contains the main axis X0 of rotation of the blade and so that the axis D2 of the Halbach linear permanent magnet 40 is parallel to the main axis X0 of rotation. The Halbach linear permanent magnet 40 is preferably positioned in such a way that the strong magnetic induction 49 is developed on the outside of the circumference described lay the Halbach linear permanent magnet 40 as the blade rotates about the main axis X0 of rotation.

The stator 62 comprises an annular groove 64 formed in the plane in which the rotation of the Halbach linear permanent magnet 40 of the blade 210 is inscribed. The groove 64 is configured to accommodate the Halbach linear permanent magnet 40 and allow the spacer piece 63 to pass as they rotate about the main axis X0 of rotation. Furthermore, the stator comprises a radial coil 65 and an axial coil 66. The axis of winding X3 of the radial coil 65 is secant with the main axis X0 of rotation and makes a right angle therewith. The axis of winding X4 of the axial coil 66 is parallel to the main axis X0 of rotation. This means that the respective axes of winding X3 and X4 of the radial coil and of the axial coil are substantially orthogonal. The radial coil 65 is both on the outside and in the plane of the cylinder in which the rotation of the second elementary magnet 42 of the Halbach linear permanent magnet 40 is inscribed. The axial coil 66 is on the outside and in the plane of the cylinder in which the rotation of the third elementary magnet 43 of the Halbach linear permanent magnet 40 is inscribed. The radial coil 65 is said to be close to the axial coil 66 because the distance separating the radial 65 and axial 66 coils is, for example, less than five times the length of the Halbach linear permanent magnet 40. When, under the effect of the rotation of the blade about the main axis X0 of rotation, the Halbach linear permanent magnet 40 is simultaneously closest to the radial coil 65 and to the axial coil 66, the field lines of the strong magnetic induction 49 of the Halbach linear permanent magnet align with the axis of winding X3 of the radial coil 65 and the axis of winding X4 of the axial coil 66. As the blade 210 rotates about the main axis X0 of rotation, the radial coil 65 and the axial coil 66 cooperate with the strong magnetic induction 49 of the Halbach linear permanent magnet 40. The radial coil 65 and the axial coil 66 are able to generate an induced current I. Advantageously, a second axial coil 67 may be positioned in the rotor 62 to collaborate with the strong magnetic field 49 in a region situated in plumb with the fourth elementary magnet 44.

The present invention applies whatever the shape of the blades or the position of the axis of rotation with respect to the blades. The materials of which the rotor is made may vary widely. They are preferably non-magnetic. The fluid driving the blade can be any. It needs to be suited to the type of blade and may be liquid or gaseous, particularly mineral or biological. The dimensions of the turbine can be any. In particular, the invention allows the turbine to be miniaturized and even incorporated with micromechanic techniques since, in such instances, there is no need to position in the stator metallic pole pieces that could prove difficult to produce. The low masses of moving parts, and the reduced dimensions are favorable to optimum turbine operation at low fluid speeds. In the embodiments described, the rotor is not attracted by the magnetic masses of the stator. The rotor can therefore have a low mass because it does not need to be highly rigid. Another result of this is that the rotor can be supported magnetically and the mechanical bearings associated with the rotation shaft can be omitted. This results in a further weight saving and in a possibility to miniaturize.

The type of turbine described can be used in a hostile environment because the magnets are partially protected in a close fitting cavity, the coils can be fixed to the stator or may alternatively be embedded in the material of which the stator is made. In general, and this can be applied to all the embodiments of the present invention described hereinabove, the permanent magnet can be mounted on the blade via a spacer piece. When it is, the cavity surrounding and protecting the permanent magnet may be designed to surround the permanent magnet on all its faces leaving just space for the spacer piece to pass. Furthermore, when a spacer piece is being used, because the permanent magnet is held away from the blade by the spacer piece it becomes possible to position coils, for picking up the current, in the volume left free between the permanent magnet and the blade.

The possibilities of forming permanent magnets, of combining them, of generating Halbach arrays, of positioning the magnets in relation to the axis of rotation are infinite. In particular, it is possible on the same rotor to assemble blades each comprising, for example, dipole magnets with different orientations. We have described just a few typical examples. There are far more examples that a person skilled in the art could readily conceive of by using the teachings of the present invention. Likewise there are a great many possibilities available for designing the shape and materials of the coils. There are also a great many possibilities regarding how to position the coils in the variable magnetic induction generated by the permanent magnets. Finally, the teaching of the present invention can easily be used to combine various elements of the various embodiments in order to design a turbine.

The invention claimed is:

1. A turbine to generate an electric current, the turbine comprising:
   a rotor having a blade mounted to rotate about a main axis, and a permanent magnet, having an axis that is parallel to the main axis, mounted on the blade via a spacer piece at a position most distant from the main axis, and
   a stator provided with two looped coil windings to generate the electric current by collaboration with the permanent magnet, the two coil windings having substantially orthogonal axes, the first coil being arranged in a first region and having an axis parallel to the main axis, the second coil being arranged in a second region and having an axis perpendicular to the main axis,
   wherein the stator includes an annular groove shaped to conform to the shape of the permanent magnet, wherein the two looped coil winding are located outside of and along the periphery of the annular groove,
   wherein the two coil windings are formed from two separate wires,
   wherein for a position of the permanent magnet, the two coil windings are simultaneously subjected to a magnetic field of the permanent magnet to generate the electric current.

2. The turbine as claimed in claim 1, in which the first and second coils have cores made of non-magnetic material.

3. The turbine as claimed in claim 1, in which the permanent magnet is a permanent dipole magnet oriented parallel to the main axis of rotation of the blade.

4. The turbine as claimed in claim 1, of which the permanent magnet comprises elementary magnets configured as a Halbach array.

5. The turbine as claimed in claim 1, in which the blade constitutes part of an impeller mounted to rotate about the main axis.

6. The turbine as claimed in claim 1, in which the stator surrounds the rotor.

7. The turbine as claimed in claim 6, in which the stator comprises a groove formed in a plane in which the rotation of the permanent magnet of the blade can be inscribed.

8. The turbine as claimed in claim 1, in which the north pole of the permanent magnet is directed toward the front of the turbine.

9. A turbine to generate an electric current, the turbine comprising:
   a rotor having a blade mounted to rotate about a main axis, and a permanent magnet, having an axis that is parallel to the main axis, mounted on the blade via a spacer piece at a position most distant from the main axis, and
   a stator provided with two looped coil windings to generate the electric current by collaboration with the permanent magnet, the two coil windings having substantially orthogonal axes, the first coil being arranged in a first region and having an axis parallel to the main axis, the second coil being arranged in a second region and having an axis perpendicular to the main axis,
   wherein the stator includes an annular groove shaped to conform to the shape of the permanent magnet,
   wherein the two looped coil winding are located outside of and along the periphery of the annular groove,
   wherein each of the two coil windings is formed from a separate wire,
   wherein for a position of the permanent magnet, the two coil windings are simultaneously subjected to a magnetic field of the permanent magnet to generate the electric current.

10. The turbine as claimed in claim 9, in which the first and second coils have cores made of non-magnetic material.

11. The turbine as claimed in claim 9, in which the permanent magnet is a permanent dipole magnet oriented parallel to the main axis of rotation of the blade.

12. The turbine as claimed in claim 9, of which the permanent magnet comprises elementary magnets configured as a Halbach array.

13. The turbine as claimed in claim 9, in which the blade constitutes part of an impeller mounted to rotate about the main axis.

14. The turbine as claimed in claim 9, in which the stator surrounds the rotor.

15. The turbine as claimed in claim 14, in which the stator comprises a groove formed in a plane in which the rotation of the permanent magnet of the blade can be inscribed.

16. The turbine as claimed in claim 9, in which the north pole of the permanent magnet is directed toward the front of the turbine.

17. A turbine to generate an electric current, the turbine comprising:
   a rotor having a blade mounted to rotate about a main axis, and a permanent magnet, having an axis that is parallel to the main axis, mounted on the blade via a spacer piece at a position most distant from the main axis,
   a diskoid coil formed from a wire comprising two looped coil windings,
   a stator provided with the two looped coil windings to generate the electric current by collaboration with the permanent magnet, the two coil windings having substantially orthogonal axes, the first coil being arranged in a first region and having an axis parallel to the main axis, the second coil being arranged in a second region and having an axis perpendicular to the main axis,
   wherein the stator includes an annular groove shaped to conform to the shape of the permanent magnet,
   wherein the two looped coil winding are located outside of and along the periphery of the annular groove, wherein for a position of the permanent magnet, the two coil windings are simultaneously subjected to a magnetic field of the permanent magnet to generate the electric current.

18. A turbine to generate an electric current, the turbine comprising:
- a rotor having a blade mounted to rotate about a main axis, and a permanent magnet, having an axis that is parallel to the main axis, mounted on the blade at a position most distant from the main axis, and
- a stator provided with two looped coil windings to generate the electric current by collaboration with the permanent magnet, the two coil windings having substantially orthogonal axes, the first coil being arranged in a first region and having an axis parallel to the main axis, the second coil being arranged in a second region and having an axis perpendicular to the main axis,
- wherein the stator includes an annular groove shaped to conform to the shape of the permanent magnet, wherein the two looped coil winding are located outside of and along the periphery of the annular groove, wherein the two looped coil windings are separated by a distance less than five times the distance between poles of the permanent magnet,
- wherein the two coil windings are formed from two separate wires,
    - wherein for a position of the permanent magnet, the two coil windings are simultaneously subjected to a magnetic field of the permanent magnet to generate the electric current.

* * * * *